United States Patent
Tokunaga et al.

(10) Patent No.: US 11,720,820 B2
(45) Date of Patent: Aug. 8, 2023

(54) OPERATIONAL SUPPORT SYSTEM AND METHOD

(71) Applicant: Hitachi, Ltd., Tokyo (JP)

(72) Inventors: Kazuaki Tokunaga, Tokyo (JP); Yuto Kojima, Tokyo (JP); Yutaro Kato, Tokyo (JP); Shimei Ko, Tokyo (JP); Atsushi Ito, Tokyo (JP)

(73) Assignee: HITACHI, LTD., Tokyo (JP)

( * ) Notice: Subject to any disclaimer, the term of this patent is extended or adjusted under 35 U.S.C. 154(b) by 232 days.

(21) Appl. No.: 17/006,964

(22) Filed: Aug. 31, 2020

(65) Prior Publication Data
US 2021/0110304 A1  Apr. 15, 2021

(30) Foreign Application Priority Data
Oct. 9, 2019 (JP) .................. 2019-186319

(51) Int. Cl.
*G06N 20/00* (2019.01)
*G06Q 30/02* (2023.01)

(52) U.S. Cl.
CPC ......... *G06N 20/00* (2019.01); *G06Q 30/0278* (2013.01)

(58) Field of Classification Search
CPC ... G06N 20/00; G06K 9/6282; G06Q 10/1053
See application file for complete search history.

(56) References Cited

U.S. PATENT DOCUMENTS

| | | |
|---|---|---|
| 10,209,974 B1 | 2/2019 | Patton et al. |
| 2016/0155070 A1* | 6/2016 | Hoover .................. G06N 20/20 706/12 |
| 2017/0223036 A1* | 8/2017 | Muddu ............... G06F 16/9024 |
| 2018/0005134 A1* | 1/2018 | Kish ...................... G06N 3/084 |
| 2018/0089592 A1* | 3/2018 | Zeiler .................... G06N 20/00 |
| 2019/0197396 A1* | 6/2019 | Rajkumar ................ G06N 3/08 |
| 2019/0213475 A1* | 7/2019 | Erlandson ........... G06F 18/2411 |
| 2020/0050443 A1* | 2/2020 | Edelsten ................ G06N 3/047 |
| 2020/0057958 A1* | 2/2020 | Moore .................. G06N 20/00 |
| 2020/0402013 A1* | 12/2020 | Yeung ................ G06Q 10/1053 |

FOREIGN PATENT DOCUMENTS

| | | |
|---|---|---|
| JP | 2016-110290 A | 6/2016 |
| JP | 2019-087101 A | 6/2019 |

OTHER PUBLICATIONS

Japanese Office Action received in corresponding Japanese Application No. 2019-186319 dated Jun. 22, 2021.

* cited by examiner

*Primary Examiner* — Saba Dagnew
(74) *Attorney, Agent, or Firm* — Mattingly & Malur, PC

(57) ABSTRACT

A system performs operation monitoring in which a learning model in operation is monitored. In the operation monitoring, the system performs a first certainty factor comparison to determine, each time the learning model in operation to which input data is input outputs output data, whether or not a certainty factor of the learning model is below a first threshold. In a case where a result of the first certainty factor comparison is true, the system replaces the learning model in operation with any of candidate learning models having a certainty factor higher than the certainty factor of the learning model in operation in which the result of true is obtained among one or more candidate learning models (one or more learning models each having a version different from a version of the learning model in operation), as a learning model of an operation target.

9 Claims, 12 Drawing Sheets

FIG. 3

MODEL MANAGEMENT TABLE
110

| MODEL ID | VERSION | LEARNING START | LEARNING END | PRODUCT ID | PRODUCT NAME | CERTAINTY FACTOR |
|---|---|---|---|---|---|---|
| M100 | Ver.1 | 2017/7/10 | - | 10100 | P100 | 70 |
| M200 | Ver.1 | 2017/7/10 | - | 10200 | P200 | 80 |
| M300 | Ver.1 | 2017/7/10 | - | 10300 | P300 | 85 |
| M150 | Ver.1 | 2017/7/11 | - | 10150 | P150 | 80 |
| ⋮ | ⋮ | ⋮ | ⋮ | ⋮ | ⋮ | ⋮ |
| M100 | Ver.2 | 2017/7/12 | - | 10100 | P100 | 90 |
| M200 | Ver.2 | 2017/7/12 | - | 10200 | P200 | 95 |
| ⋮ | ⋮ | ⋮ | ⋮ | ⋮ | ⋮ | ⋮ |
| 111 | 112 | 113 | 114 | 115 | 116 | 117 |

FIG. 4

OPERATION MANAGEMENT TABLE
120

| MODEL ID | VERSION | DEPLOYMENT DAY | ACTIVATION | INSPECTION TRACK RECORD COUNT | ... |
|---|---|---|---|---|---|
| M100 | Ver.1 | 2017/8/12 | 0 | 500 | ... |
| M200 | Ver.1 | 2017/8/12 | 1 | 300 | ... |
| ... | ... | ... | ... | ... | ... |
| M100 | Ver.2 | 2018/9/14 | 1 | 200 | ... |
| ... | ... | ... | ... | ... | ... |

TEACHING DATA MANAGEMENT TABLE
130

| PRODUCT ID | PRODUCT NAME | SERIAL NUMBER | TRACK RECORD | MEASURED DATA | ... |
|---|---|---|---|---|---|
| 10100 | P100 | 10017082205 | FAULTY PRODUCT | ... | ... |
| ... | ... | ... | ... | ... | ... |
| 10200 | P200 | 20017082210 | GOOD PRODUCT | ... | ... |
| ... | ... | ... | ... | ... | ... |
| 10300 | P300 | 30017082215 | FAULTY PRODUCT | ... | ... |
| ... | ... | ... | ... | ... | ... |

131  132  133  134  135

OPERATIONAL SUPPORT SYSTEM AND METHOD

CROSS-REFERENCE TO PRIOR APPLICATION

This application relates to and claims the benefit of priority from Japanese Patent Application number 2019-186319, filed on Oct. 9, 2019 the entire disclosure of which is incorporated herein by reference.

BACKGROUND

The present invention generally relates to an operational support of a learning model.

From the viewpoints of cost reduction and improved operational efficiency, consciousness of business restructuring using artificial intelligence (AI) (for example, machine learning) is being promoted in each field. In particular, in a product inspection process, a problem is that it is becoming difficult to stabilize an inspection quality, educate inspectors, and secure skilled workers. For this reason, an expectation for automation of the inspection process by the AI is being raised.

To realize the automation of the inspection process, it is conceivable to operate a learning model created by the machine learning.

However, the learning model may deteriorate in some cases. Reference 1 discloses a prediction model as an example of the learning model. A prediction model maintenance system disclosed in Reference 1 includes creating a new prediction model, and selecting one of the prediction model and the new prediction model that has the higher evaluation than the other as an operational prediction model.

Reference 1: Japanese Patent Laid-Open No. 2019-87101

SUMMARY

As a result of intensive studies on an operation of a learning model for automating a product inspection process, the inventors of the present application has attained the following finding.

A learning model to which inspection data of a product is input inspects the product using the inspection data, and outputs inspection result data representing a result of the inspection (for example, whether the product is normal or abnormal). If the learning model in operation is degraded, a first case where the inspection result data representing a faulty product (abnormal product) is output even when inspection data representing a good product (normal product) is input, or a second case where the inspection result data representing a good product is output even when the inspection data representing a faulty product is input may occur.

When the first case occurs, the number of good products that are not shipped may continuously increase.

When the second case occurs, although shipment of the faulty products could be avoided by an inspection performed in a subsequent stage serving as an inspection after the product inspection by the learning model (for example, a final inspection immediately before the shipment), the faulty products may be continuously produced during a period from the product inspection by the learning model to the inspection performed in the subsequent stage.

In a case where the learning model is operated in a field other than production inspection process, the above-described problem may also occur, that is, a problem that a situation continues where output data is output representing that a target is abnormal even when input data is input representing that the target is normal, and output data is output representing that a target is normal even when input data is input representing that the target is abnormal, in other words, a problem that the content represented by the input data continuously differs from the content represented by the output data with regard to the target.

The prediction model maintenance system disclosed in Reference 1 is a system detached from an operational environment of a prediction model, and is configured to evaluate the prediction model at a timing that does not rely on a certainty factor of the prediction model. For this reason, the above-described problem is not solved.

A system monitors a certainty factor of the learning model in operation (for example, each time the output data is output) in real time. Specifically, for example, the system performs relearning in which one or a plurality of learning models each having a different version are created, and also performs operation monitoring in which the learning model in operation is monitored. In the operation monitoring, the system performs a first certainty factor comparison to determine whether or not a certainty factor of the learning model is below a first threshold each time the learning model in operation to which the input data is input outputs the output data. In a case where a result of the first certainty factor comparison is true, the system replaces the learning model in operation with any of the candidate learning models having a certainty factor higher than the certainty factor of the learning model in operation which has obtained the above-described true result among one or more candidate learning models (one or more learning models each having a version different from the version of the learning model in operation), as a learning model of an operation target.

According to one aspect of the present invention, it is possible to suppress the situation where the content represented by the input data with regard to the target continuously differs from the content represented by the output data.

BRIEF DESCRIPTION OF THE DRAWINGS

FIG. 3 is a drawing illustrating a configuration of a model management table;

FIG. 4 is a drawing illustrating a configuration of an operation management table;

FIG. 5 is a drawing illustrating a configuration of a teaching data management table;

DESCRIPTION OF EMBODIMENTS

Figure 1:
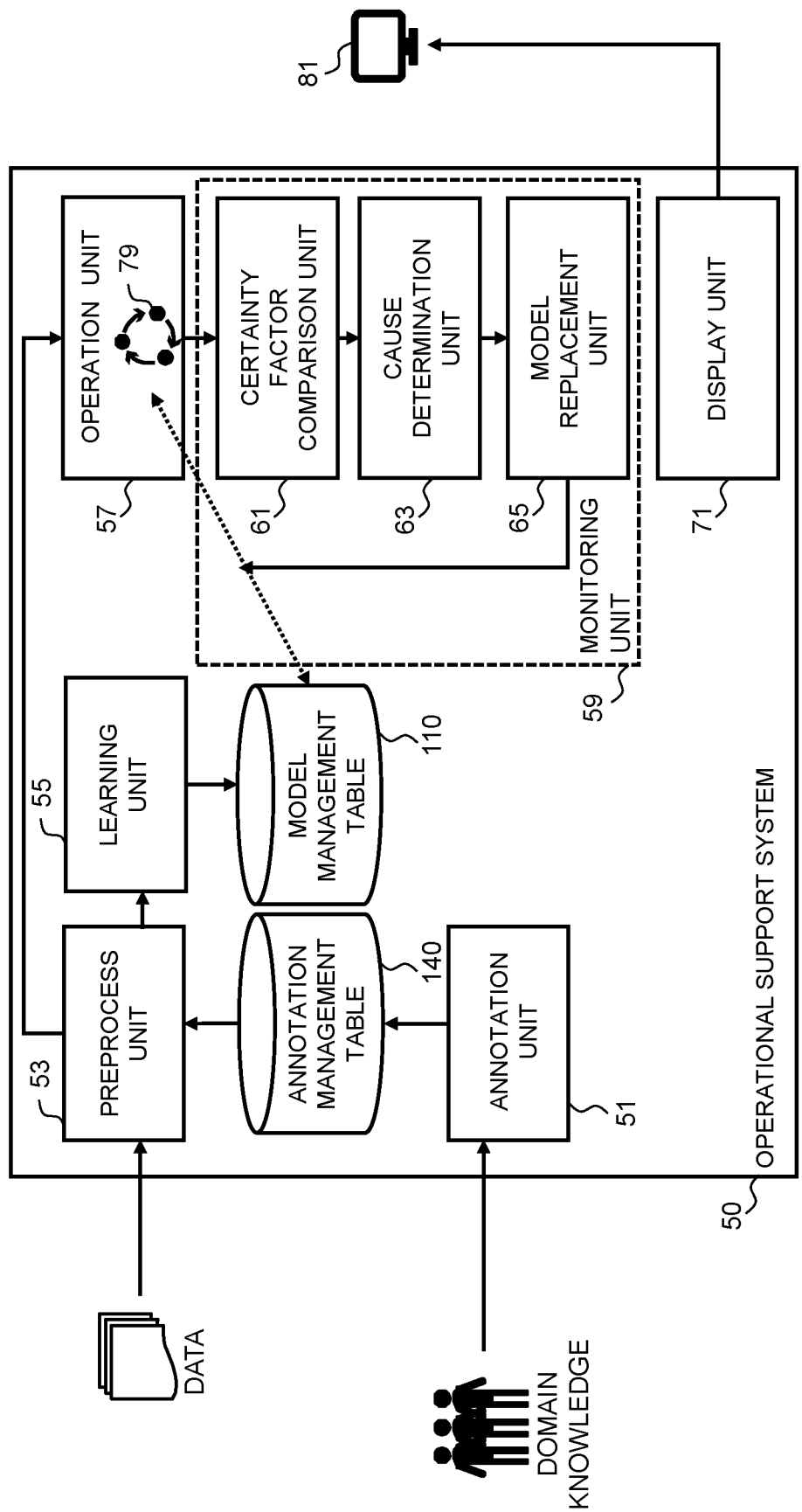
FIG. 1 is a drawing illustrating an outline of an operational support system according to a first embodiment.

In the following explanation, an "interface apparatus" may be one or more interface apparatuses. The one or more interface apparatuses may be at least one of the following devices:

One or more input/output (I/O) interface devices. The input/output (I/O) interface device is an interface device for at least one of an I/O device and a remote display computer. The I/O interface device for the display computer may be a communication interface device. The at least one I/O device may also be any of user interface devices such as, for example, input devices like a keyboard and a pointing device and output devices such as a display device.

One or more communication interface devices. The one or more communication interface devices may also be one or more communication interface devices of the same type (for example, one or more network interface cards (NICs)), or may also be two or more communication interface devices of different types (for example, an NIC and a host bus adapter (HBA)).

In addition, in the following explanation, a "memory" includes one or more memory devices, and may be typically a main memory device. At least one memory device in the memory may also be a volatile memory device or may also be a non-volatile memory device.

In addition, in the following explanation, a "permanent storage apparatus" includes one or more permanent storage devices. The permanent storage device is typically a non-volatile storage device (for example, an auxiliary storage device), and is specifically, for example, a hard disk drive (HDD) or a solid state drive (SSD).

In addition, in the following explanation, a "storage apparatus" may be at least the memory out of the memory and the permanent storage apparatus.

In addition, in the following explanation, a "processor" includes one or more processor devices. At least one processor device is typically a microprocessor device such as a central processing unit (CPU), but may also be a processor device of another type such as a graphics processing unit (GPU). At least one processor device may also be a single-core device, or may also be a multi-core device. At least one processor device may also be a processor-core device. At least one processor device may also be a processor device in a broad sense such as a hardware circuit configured to perform a part or all of processes (for example, a field-programmable gate array (FPGA) or an application specific integrated circuit (ASIC)).

In addition, in the following explanation, information with which an output is obtained in response to an input may be described in some cases using an expression like an "xxx table", but the information may also be data of any structure, or may also be a learning model such as a neural network in which an output in response to an input is generated. Therefore, the "xxx table" can be rephrased as "xxx information". In addition, in the following explanation, a configuration of each table is an example. One table may be divided into two or more tables, and all or a part of the two or more tables may also be one table.

In addition, in the following explanation, a function may be described in some cases using an expression like "fff unit", but the function may also be realized when one or more computer programs are executed by the processor, or may also be realized by one or more hardware circuits (for example, the FPGA or the ASIC). In a case where the function is realized when a program is executed by the processor, since predetermined processing is performed appropriately using the storage apparatus and/or the interface apparatus and the like, the function may also be at least a part of the processor. The processing in which the function is described as a subject may also be processing performed by a processor or an apparatus including the processor. The program may also be installed from a program source. For example, the program source may also be a program distribution computer or a recording medium that can be read by a computer (for example, a non-transitory recording medium). The description of each function is an example, and a plurality of functions may be compiled into one function, or one function may also be divided into a plurality of functions.

In addition, in the following explanation, an "operational support system" may also be one or more physical computers, may also be a software-defined system realized when at least one physical computer executes predetermined software, or may also be a system realized on a computation resource group corresponding to a plurality of computation resources (for example, a cloud platform). The operational support system may include at least one of an edge apparatus configured to transmit data and a core apparatus configured to receive data.

In addition, in the following explanation, an "ID" of an element is identification information. The ID may also be information represented using alphanumerics and the like, or may include a name of the element instead of or in addition to the alphanumerics and the like.

In addition, in the following explanation, measurements of the time are year, month, and day, but the measurements of the time may also be less detailed or more detailed.

In addition, in the following explanation, in a case where elements of the same type are described without being distinguished from each other, common parts in reference signs are used. In a case where elements of the same type are described while being distinguished from each other, reference signs may be used in some cases. For example, an "edge apparatus 92" is mentioned in a case where edge apparatuses are not distinguished from each other, and an "edge apparatus 92A" and an "edge apparatus 92B" are mentioned in a case where the edge apparatuses are distinguished from each other.

In addition, in the following explanation, a "learning model" is abbreviated as a "model". According to the following embodiments, a neural network created by deep learning is adopted as the model, but a model of another type such as, for example, an autoregressive moving average model (for example, an autoregressive integrated moving average (ARIMA) model) may also be adopted as the model.

In addition, according to the following embodiments, a product inspection process will be used as an example. For this reason, input data that is input to the learning model in operation is inspection data of a product (for example, data having measurement data including one or more measured values obtained when one or more measurement items with regard to the product are respectively measured). Output data that is output from the learning model is inspection result data representing a result of the processing using the inspection data (for example, a result on whether the product is normal or abnormal). The present invention may also be applied to a field other than the product inspection process. It is noted that a "product" generally means a produced article, that is, a so-called completed article, but in the following explanation, the "product" may mean articles in general which are input to a production system (for example, a production line). Therefore, in the following explanation, for example, the "product" may also be any of an article before the article is input to the production system, an article in the middle of the production system (so-called "partly-completed article"), and a completed article in a state where shipping is allowed after all relevant processes in the production system are performed.

First Embodiment

FIG. 1 is a drawing illustrating an outline of an operational support system according to a first embodiment.

An operational support system 50 performs operation monitoring for monitoring a certainty factor of a model 79 in operation in real time (for example, each time the inspection result data is output). For this reason, when deterioration of the model 79 in operation occurs (when the certainty factor of the model 79 in operation decreases to be lower than a threshold), the operational support system 50 can immediately detect the deterioration. In a case where the deterioration of the model 79 is detected, the operational support system 50 implements countermeasures such as replacement of the model 79 with a model of another version having a higher certainty factor than that of the model 79. With this configuration, it is possible to suppress the situation where the content represented by the inspection data of the product (for example, normal or abnormal) continuously differs from the content represented by the inspection result data of the product (for example, normal or abnormal).

The operational support system 50 includes an annotation unit 51, a preprocess unit 53, a learning unit 55, an operation unit 57, a monitoring unit 59, a display unit 71, an annotation management table 140, and a model management table 110.

The annotation unit 51 accepts annotation data representing an annotation with regard to the data that is input to the model (for example, a definition), and registers the annotation data in the annotation management table 140. The annotation may be based on knowledge of a person related to the product inspection, for example. The annotation may be at least one of a good product condition corresponding to a condition of inspection data representing a good product (normal product) and an abnormal condition corresponding to a condition of inspection data representing a faulty product (abnormal product). A case relevant to the good product condition may also be a case where the good product condition itself is satisfied, or may also be a case where the abnormal condition is not satisfied.

The preprocess unit 53 transfers the inspection data input from a data source (not illustrated) such as an edge apparatus like a product inspection apparatus to the operation unit 57, and inputs the inspection data to the learning unit 55 when the inspection data satisfies the good product condition on the basis of the annotation management table 140. The input of the inspection data satisfying the good product condition to the learning unit 55 may be performed by registering the inspection data in a data management table to which the learning unit 55 refers for creating a model (at least one of a teaching data management table and an inspection data management table which will be described below).

The learning unit 55 newly creates a model and relearns the model (creates one or more learning models each having a version different from the version of the model). The learning unit 55 registers the created model in the model management table 110.

The operation unit 57 operates any of the models registered in the model management table 110. When the model is deployed to the operation unit 57, the operation by the operation unit 57 can be performed. The operation unit 57 may also be referred to as a deduction unit.

The monitoring unit 59 performs operation monitoring in real time corresponding to the monitoring of the model 79 in operation (for example, each time the inspection result data is output, or regularly). The monitoring unit 59 includes a certainty factor comparison unit 61, a cause determination unit 63, and a model replacement unit 65.

The certainty factor comparison unit 61 performs certainty factor comparison to determine whether or not the certainty factor of the model is below a predetermined threshold each time the model 79 in operation to which the inspection data is input outputs the inspection result data. In addition, the certainty factor comparison unit 61 compares the certainty factor of the model 79 in operation with a certainty factor of a candidate model replacing the model 79. In addition, with regard to the same model, the certainty factor comparison unit 61 compares the certainty factor of the model in a case where the inspection data that is input for creating the model is input with the certainty factor of the model in a case where inspection data newer than the inspection data is input.

The cause determination unit 63 determines whether a cause with which the certainty factor of the model 79 in operation is below the predetermined threshold exists in the data that is input to the model or exists in the model itself.

The model replacement unit 65 replaces the model 79 in operation with a model having a version different from the version of the model 79 as the model of the operation target.

The display unit 71 transmits information such as information related to the result of the operation monitoring (for example, information including the current certainty factor of the model 79 in operation and information representing the certainty factor of the replacement candidate model), information related to the result of the relearning (for example, information representing the version of each of one or more models obtained with regard to the model 79 in operation), and information representing the annotation to a computer 81 coupled to the operational support system 50 so as to be communicable with each other such that the information is displayed. These pieces of information may be at least a part of the information represented by at least one of the tables 110 to 150 (see FIG. 2) and the information serving as the results of various types of processing.

Hereinafter, the present embodiment will be described in detail.

Figure 2:
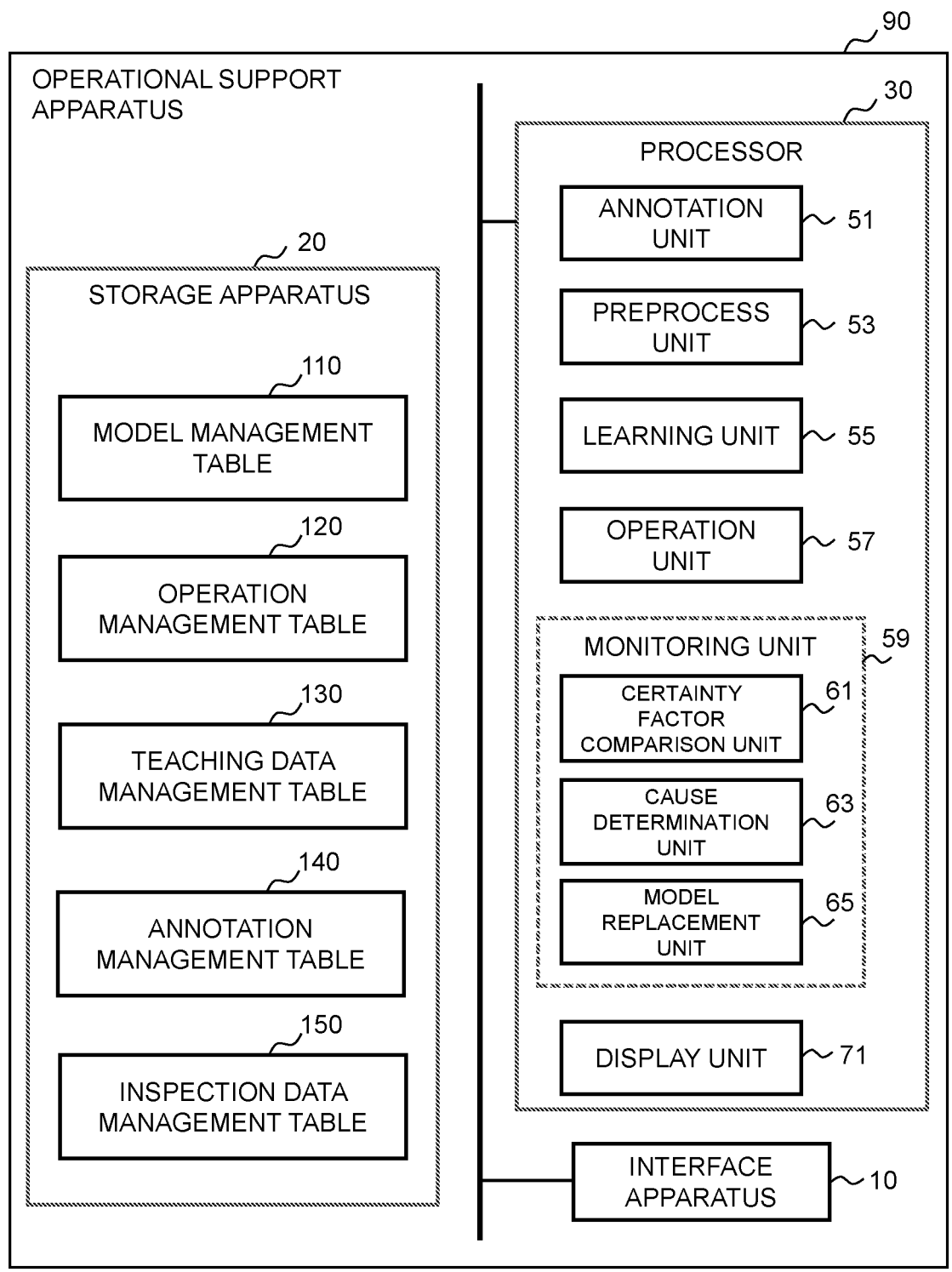
FIG. 2 is a drawing illustrating a configuration of an operation monitoring apparatus.

FIG. 2 is a drawing illustrating a configuration of an operational support apparatus.

With regard to the production inspection process, in general, a plurality of edge apparatuses configured to respectively transmit the inspection data, and a core apparatus configured to receive inspection data from each of the plurality of edge apparatuses are provided. At least one of the edge apparatuses may also be a sensor apparatus configured to measure a predetermined measurement item with regard to the product and transmit inspection data including a measured value, or may also be a relay apparatus (for example, an edge server or a gateway) configured to receive the inspection data from one or more sensor apparatuses. The relay apparatus may also transfer the received inspection data to the core apparatus as it is, or may also process the inspection data (for example, create the inspection data as a summary of the inspection data for a certain period) and transfer the processed inspection data to the core apparatus.

An operational support apparatus 90 is an example of the core apparatus, and is equivalent of the operational support system 50 itself according to the present embodiment. The operational support apparatus 90 may also be a computer system having an interface apparatus 10, a storage apparatus 20, and a processor 30, or may also be a system including at least the learning unit 55 and the monitoring unit 59 among the annotation unit 51, the preprocess unit 53, the learning unit 55, the operation unit 57, the monitoring unit 59, and the display unit 71 which are realized on a computation resource group including these computation resources.

The interface apparatus 10 is an apparatus configured to communicate with an external apparatus via a network (for example, the Internet). The external apparatus includes, for example, a client computer such as the computer 81 illustrated in FIG. 1 and the above-described edge apparatus.

The storage apparatus 20 stores management data and one or more programs that are not illustrated in the drawing. The management data includes, for example, the model management table 110, the operation management table 120, the teaching data management table 130, the annotation management table 140, and the inspection data management table 150.

When one or more programs in the storage apparatus 20 are executed by the processor 30, functions such as the annotation unit 51, the preprocess unit 53, the learning unit 55, the operation unit 57, the monitoring unit 59, and the display unit 71 which are described above are realized.

FIG. 3 is a drawing illustrating a configuration of the model management table 110.

The model management table 110 holds information representing the model. Respective records in the model management table 110 hold information such as, for example, a model ID 111, a version 112, learning start 113, learning end 114, a product ID 115, a product name 116, and a certainty factor 117. The record corresponds to a model. Hereinafter, one record will be used as an example (a model corresponding to the record in the explanation in FIG. 3 will be referred to as a "focused model").

The model ID 111 represents an ID of the focused model. The version 112 represents a version of the focused model. A model is identified from a pair of the model ID 111 and the version 112. The learning start 113 represents a day when learning of the focused model is started. The learning end 114 represents a day when the learning of the focused model is ended. The product ID 115 represents an ID of a product inspected by the focused model. The product name 116 represents a name of the product inspected by the focused model. The certainty factor 117 represents a certainty factor of the focused model at a time point when the learning is ended.

FIG. 4 is a drawing illustrating a configuration of the operation management table 120.

The operation management table 120 holds information related to the model operation. Respective records in the operation management table 120 hold information such as, for example, a model ID 121, a version 122, a deployment day 123, activation 124, and an inspection track record count 125. The record corresponds to a model. Hereinafter, one record will be used as an example (a model corresponding to the record will be referred to as a "focused model" in the explanation in FIG. 4).

The model ID 121 represents an ID of the focused model. The version 122 represents a version of the focused model. The deployment day 123 represents a day when the focused model is deployed to the operation unit 57. The activation 124 represents whether or not the focused model is the model in operation, where "1" means in operation, and "0" means not in operation. The inspection track record count 125 represents the number of products inspected by the focused model.

FIG. 5 is a drawing illustrating a configuration of the teaching data management table 130.

The teaching data management table 130 holds information related to teaching data. Respective records in the teaching data management table 130 hold information such as, for example, a product ID 131, a product name 132, a serial number 133, track record 134, and measured data 135. The record corresponds to the teaching data (for example, which may be the teaching data itself). Hereinafter, one record will be used as an example (in the explanation in FIG. 5, the teaching data corresponding to the record will be referred to as "focused teaching data"). It is noted that the "teaching data" may refer to data including the inspection data, and specifically, may be the inspection data prepared for learning the model.

Each of the information 131 to 135 is information included in the focused teaching data. Among the focused teaching data, the information other than the track record 134 may be information included in the inspection data. In other words, the focused teaching data may be data including the track record 134 and the inspection data. The product ID 131 represents an ID of a product. The product name 132 represents a name of the product. The serial number 133 represents a serial number of the product. The track record 134 represents whether the product is a good product or a faulty product. The measured data 135 includes one or more measured value with regard to the product. According to the present embodiment, for example, the teaching data in which the track record 134 is the "faulty product" is irrelevant to the annotation represented by the annotation management table 140, and as a result, the teaching data may be excluded since the teaching data is input to the learning unit 55 by the preprocess unit 53.

Although not illustrated in the drawing, a configuration of the inspection data management table 150 may be the same as the configuration of the teaching data management table 130. The inspection data management table 150 holds information related to the inspection data received by the operational support apparatus 90 during the operation. The record in the inspection data management table 150 may be the inspection data itself.

Hereinafter, an example of processing performed according to the present embodiment will be described.

Figure 6:
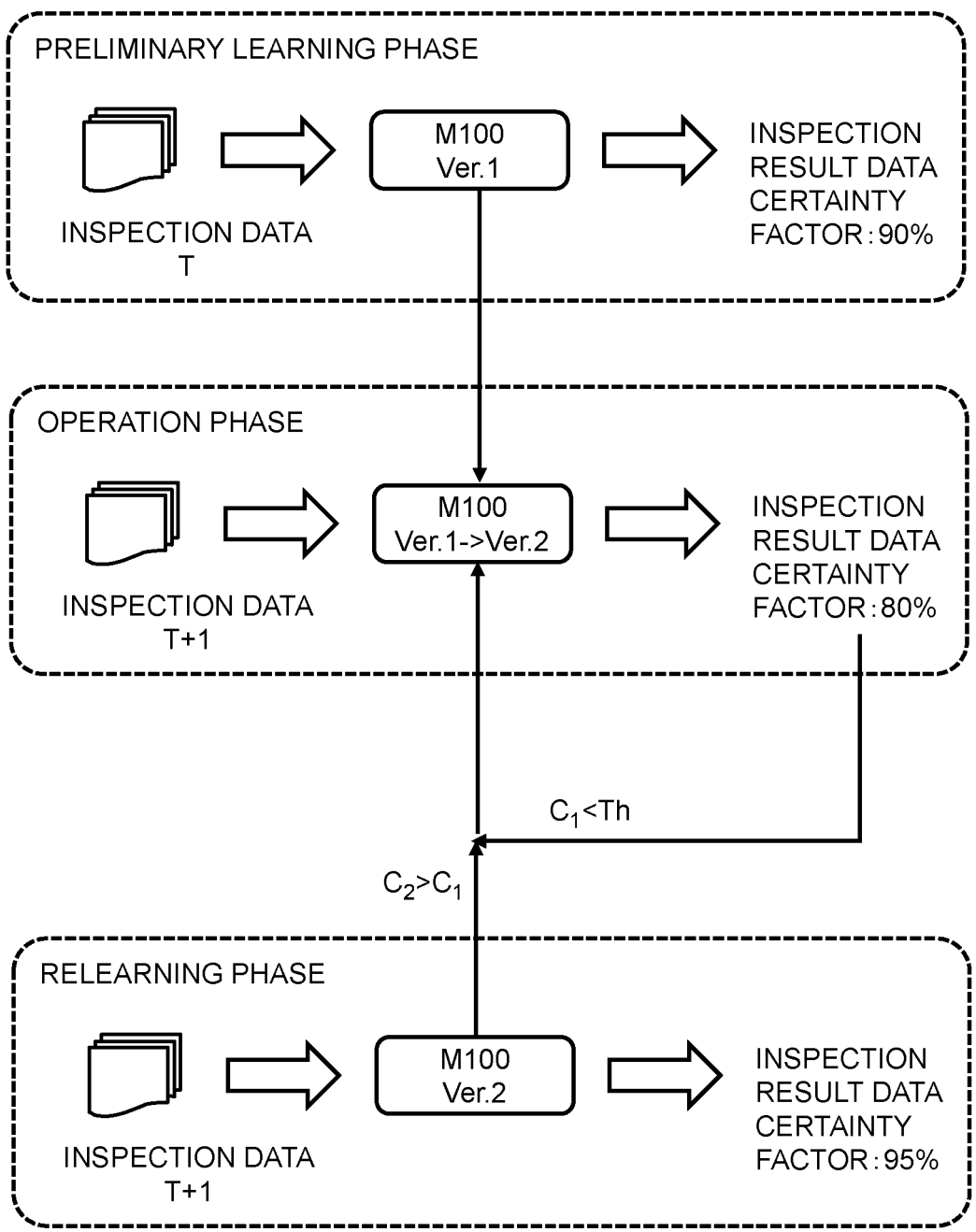
FIG. 6 is a drawing illustrating a plurality of phases according to the first embodiment.

FIG. 6 is a drawing illustrating a plurality of phases according to the present embodiment. It is noted that in the following explanation, the inspection data obtained in a period X (X-th period) is described as "inspection data X".

The phases are broadly classified into three phases including a preliminary learning phase, an operation phase, and a relearning phase.

The preliminary learning phase refers to a phase in which a model having a new model ID is created (learnt). In the preliminary learning phase, the learning unit 55 inputs inspection data T to a model of a learning target, and performs the learning of the model such that the track record included in the teaching data including the inspection data T is matched with the inspection result data serving as the result of the processing of the inspection data. In a case where the learning of the model is completed, the information representing the model is registered in each of the model management table 110 and the operation management table 120. The model is deployed to the operation unit 57. The created model has a model ID "M100" and a version "Ver. 1". Hereinafter, a model having a model ID "P" may be described as a "model P", and the model P of a version "Q" may be described as a "model P/Q" in some cases. In addition, a certainty factor of a version "Ver. K" may be described as "$C_K$" in some cases. In the example of FIG. 6, $C_1$ is "90%".

The operation phase refers to a phase in which the deployed model is operated (that is, a deduction phase). In the operation phase, the operation unit 57 operates the deployed model M100/Ver. 1. Specifically, for example, a period (T+1) subsequent to a period T is at least a part of the period in operation. The inspection data (T+1) is input to the model M100/Ver. 1 in operation, and the inspection result data serving as a result of the processing of the inspection data (T+1) is output.

The relearning phase refers to a phase in which a model having the same model ID and also having a different version is created. The relearning phase may also be regularly started, or may also be started in accordance with a relationship between the certainty factor of the model in operation and the threshold. In the relearning phase, when the learning unit 55 inputs the inspection data (T+1) (or the teaching data prepared for the relearning) to the model M100/Ver. 1 (or another model having the model ID "M100"), the relearning of the model M100/Ver. 1 is performed. As a model after the relearning, the model M100/Ver. 2 (that is, a model having the same model ID as the model M100/Ver. 1 and having a different version) is created. The information representing the model is registered in each of the model management table 110 and the operation management table 120. In the example of FIG. 6, $C_2$ is "95%".

The monitoring unit 59 monitors the model M100/Ver. 1 in operation. Each time the inspection result data from the model M100/Ver. 1 is output, in the example of FIG. 6, the monitoring unit 59 determines whether or not $C_1$ is below Th (threshold). In a case where the result of true is obtained as the result of this determination, the monitoring unit 59 replaces the model M100/Ver. 1 with the model M100/Ver. 2 that satisfies $C_2 > C_1$ as the model M100 of the operation target.

Figure 7:
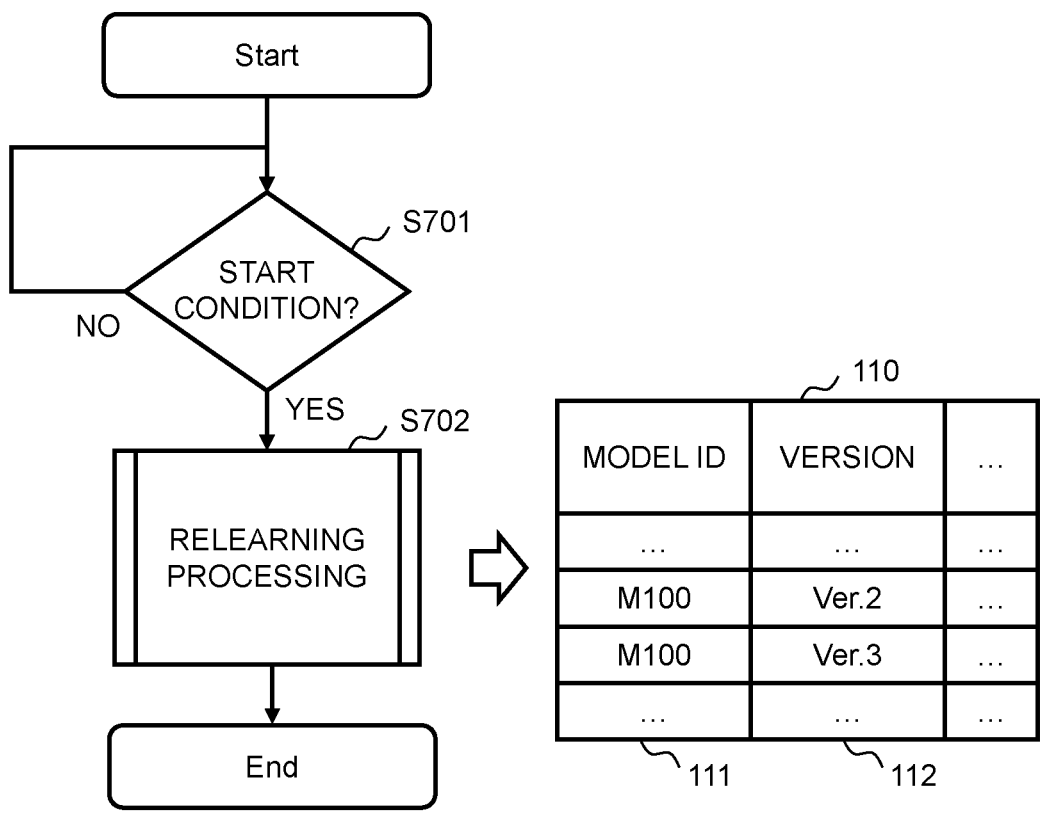
FIG. 7 is a drawing illustrating a flow of background processing performed by a learning unit.

FIG. 7 is a drawing illustrating a flow of background processing performed by the learning unit 55.

The background processing is processing performed in the background of the model operation, and is processing with regard to the created model in the preliminary learning phase. In the following explanation, the model M100 will be used as an example of the model.

The learning unit 55 determines whether or not a start condition for relearning processing of the model M100 is satisfied (S701). Any condition may be adopted as the start condition. For example, according to the present embodiment, the start condition corresponds to a situation after a certain period of time has elapsed after the latest relearning processing of the model M100 is ended. In other words, according to the present embodiment, the relearning processing is regularly performed in the background of the model operation.

In a case where the determination result in S701 is true (S701: Yes), the learning unit 55 performs the relearning processing of the model M100 (S702). For example, in the single relearning processing, the learning unit 55 creates a single model having a version different from the already created version with regard to the model M100, and registers information representing the created model in the model management table 110 (and the operation management table 120).

When the relearning processing is repeated with regard to the model M100, a model is created which has a version different from the version of the already created model (model already registered in the model management table 110).

Figure 8:
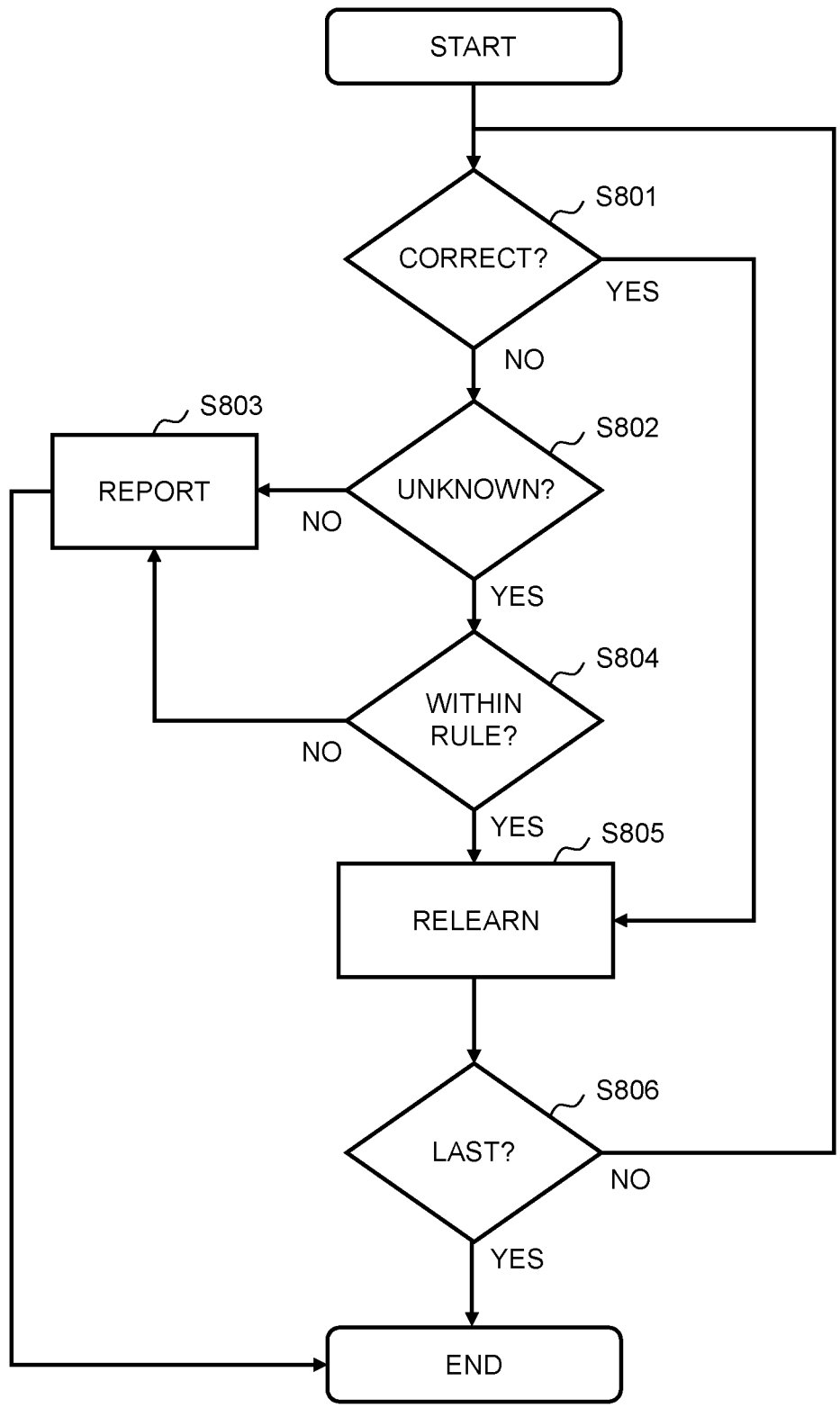
FIG. 8 is a drawing illustrating a flow of relearning processing.

FIG. 8 is a drawing illustrating a flow of the relearning processing (S702).

The learning unit 55 determines whether or not the inspection data as one of the input candidates for the relearning (in the explanation in FIG. 8, the focused inspection data) is correct data on the basis of the annotation management table 140 (S801). An example of "whether or not the focused inspection data is correct data" is whether or not the focused inspection data is relevant to a good product definition represented by the annotation with regard to the product of the inspection target of the model M100. In a case where the determination result in S801 is true (S801: Yes), S805 is performed.

In a case where the determination result in S801 is false (S801: No), the learning unit 55 determines whether or not the focused inspection data is unknown data (S802). An example of the "unknown data" may be the inspection data actually obtained during the operation instead of the inspection data serving as the teaching data (may also be referred to as training data).

In a case where the determination result in S802 is false (S802: No), it means that inappropriate inspection data exists, and the learning unit 55 performs report processing (S803). In this report processing, the learning unit 55 may transmit information meaning that inappropriate inspection data (for example, nonstandard data) is generated to a person in charge of the production line of the product represented by the focused inspection data.

In a case where the determination result in S802 is true (S802: Yes), the learning unit 55 determines whether or not the focused inspection data is within a predetermined rule (rule represented by the annotation) on the basis of the annotation management table 140 (S804). In a case where the determination result in S804 is false (S804: No), S803 is performed.

In a case where the determination result in S804 is true (S804: Yes), the learning unit 55 performs the relearning of the model M100 by inputting the focused inspection data to the model M100 having a certain version (for example, a version in operation) (S805).

After S805, the learning unit 55 determines whether or not the focused inspection data is the last data as the input candidate (S806). In a case where the determination result in S806 is false (S806: No), the learning unit 55 selects other inspection data, and performs S801 with regard to the other inspection data. In a case where the determination result in S806 is true (S806: Yes), since the model M100 having the new version is completed with regard to the model M100, the learning unit 55 registers information representing the completed model M100 having the new version in the model management table 110 (and the operation management table 120).

In the relearning processing, only the data determined as appropriate for the relearning of the model M100, such as the inspection data relevant to the annotation, is used for the relearning. For this reason, the certainty factor of the model M100 can be maintained. It is noted that S801 to S803 may be performed by the preprocess unit 53 instead of the learning unit 55.

Figure 9:
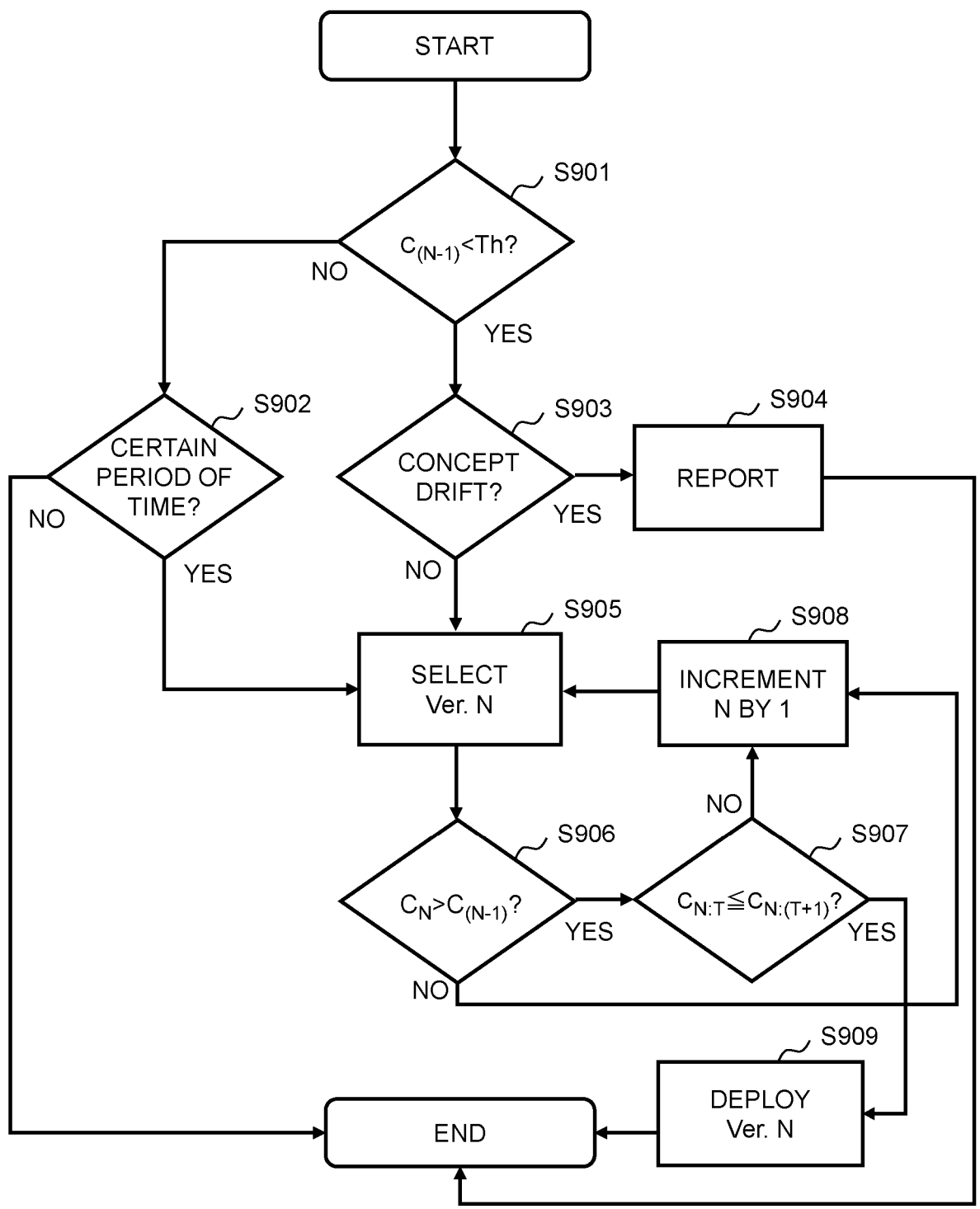
FIG. 9 is a drawing illustrating a flow of processing performed by a monitoring unit.

FIG. 9 is a drawing illustrating processing performed by the monitoring unit 59.

The version of the model M100 in operation is assumed as (N−1). Each time the inspection result data is output from the model M100/(N−1) in operation to which the inspection data is input, the certainty factor comparison unit 61 determines whether or not $C_{(N-1)}<Th$ is satisfied (S901). Th denotes a threshold.

In a case where the determination result in S901 is false (S901: No), the certainty factor comparison unit 61 refers to the operation management table 120, and determines whether or not a certain period of time has elapsed from the deployment day 123 of the model M100/(N−1) (S902). In a case where the determination result in S902 is true (S902: Yes), the certainty factor comparison unit 61 refers to the model management table 110 and the operation management table 120, and selects the model M100/N in which the activation 124 is "0" (in other words, not in operation) (S905).

In a case where the determination result in S901 is true (S901: Yes), the cause determination unit 63 determines whether or not concept drift occurs with regard to the input inspection data (S903). The determination on "whether or not the concept drift occurs" is an example of the determination on whether or not the cause of $C_{(N-1)}<Th$ is data. An example of the concept drift includes a case where an average value of measured values represented by the inspection data is changed by a certain value or more. In a case where the determination result in S903 is true (S903: Yes), the cause determination unit 63 performs the report processing (S904). In this report processing, the cause determination unit 63 may transmit information meaning that the concept drift has occurred to the person in charge of the product line for the product represented by the inspection data that is input to the model in operation.

In a case where the determination result in S903 is false (S903: No), the certainty factor comparison unit 61 performs S905, that is, selects the model M100/N.

The certainty factor comparison unit 61 determines whether or not $C_N>C_{(N-1)}$ is satisfied (S906). $C_N$ denotes a certainty factor of the model M100/N, and $C_{(N-1)}$ denotes a certainty factor of the model M100/(N−1). $C_N$ and $C_{(N-1)}$ may also be a value represented by the certainty factor 117 of the model management table 110. Alternatively, the certainty factor comparison unit 61 may also input the inspection data to each of the model M100/N and the model M100/(N−1), and the certainty factor of the model M100/N and the certainty factor of the model M100/(N−1) at that time may also respectively take $C_N$ and $C_{(N-1)}$. In addition, S906 may also be integrated with S905. That is, the model M100 of a version having a higher certainty factor than $C_{(N-1)}$ is selected in S905, and S906 may also be skipped.

In a case where the determination result in S906 is false (S906: No), the certainty factor comparison unit 61 increments N by 1 (S908), and performs S905.

In a case where the determination result in S906 is true (S906: Yes), the certainty factor comparison unit 61 inputs each of the inspection data T and the inspection data (T+1) to the model M100/N, and determines whether or not $C_{N:T} \leq C_{N:(T+1)}$ is satisfied (S907). $C_{N:T}$ denotes the certainty factor of the model M100/N in a case where the inspection data T is input. $C_{N:(T+1)}$ denotes the certainty factor of the model M100/N in a case where the inspection data (T+1) is input. The inspection data T is an example of the old inspection data, and is the inspection data used or the preliminary learning of the model M100, for example. The inspection data (T+1) is an example of the inspection data newer than the inspection data T, and is the inspection data received during the operation of the model M100, for example. In a case where the determination result in S907 is false (S907: No), the certainty factor comparison unit 61 performs S908.

In a case where the determination result in S907 is true (S907: Yes), the model replacement unit 65 deploys the model M100/N (S909). That is, the model replacement unit 65 replaces the model M100/(N−1) with the model M100/N as M100 of the operation target.

Second Embodiment

A second embodiment will be described. At this time, a difference from the first embodiment will be mainly described, and descriptions on a commonality with the first embodiment will be omitted or simplified.

Figure 10:
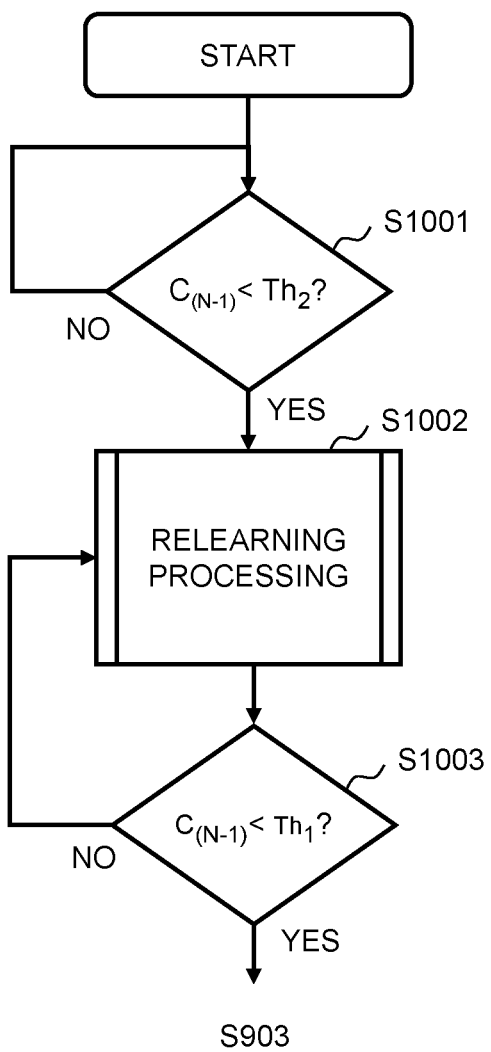
FIG. 10 is a drawing illustrating a part of a flow of processing performed by the operation monitoring apparatus according to a second embodiment.

FIG. 10 is a drawing illustrating a part of a flow of processing performed by an operation monitoring apparatus according to the second embodiment.

According to the present embodiment, the start condition of the relearning processing is that $C_{(N-1)}$ (certainty factor of the model M100/(N−1)) is lower than $Th_2$ (second threshold). In other words, the processing related to the relearning processing is the background processing according to the first embodiment, but can be regarded as the real time processing according to the present embodiment.

The certainty factor comparison unit 61 determines whether or not $C_{(N-1)}<Th_2$ is satisfied (S1001). In a case where the determination result in S1001 is true (S1001: Yes), the learning unit 55 performs the relearning processing of the model M100 (S1002).

Thereafter, the certainty factor comparison unit 61 determines whether or not $C_{(N-1)}<Th_1$ is satisfied (S1003). $Th_1$ denotes a first threshold. A technical significance of $Th_1$ and $Th_2$ will be described below.

In a case where the determination result in S1003 is false (S1003: No), S1002 is performed.

In a case where the determination result in S1003 is true (S1003: Yes), the processing in S903 and subsequent steps in FIG. 9 is performed.

Figure 11:
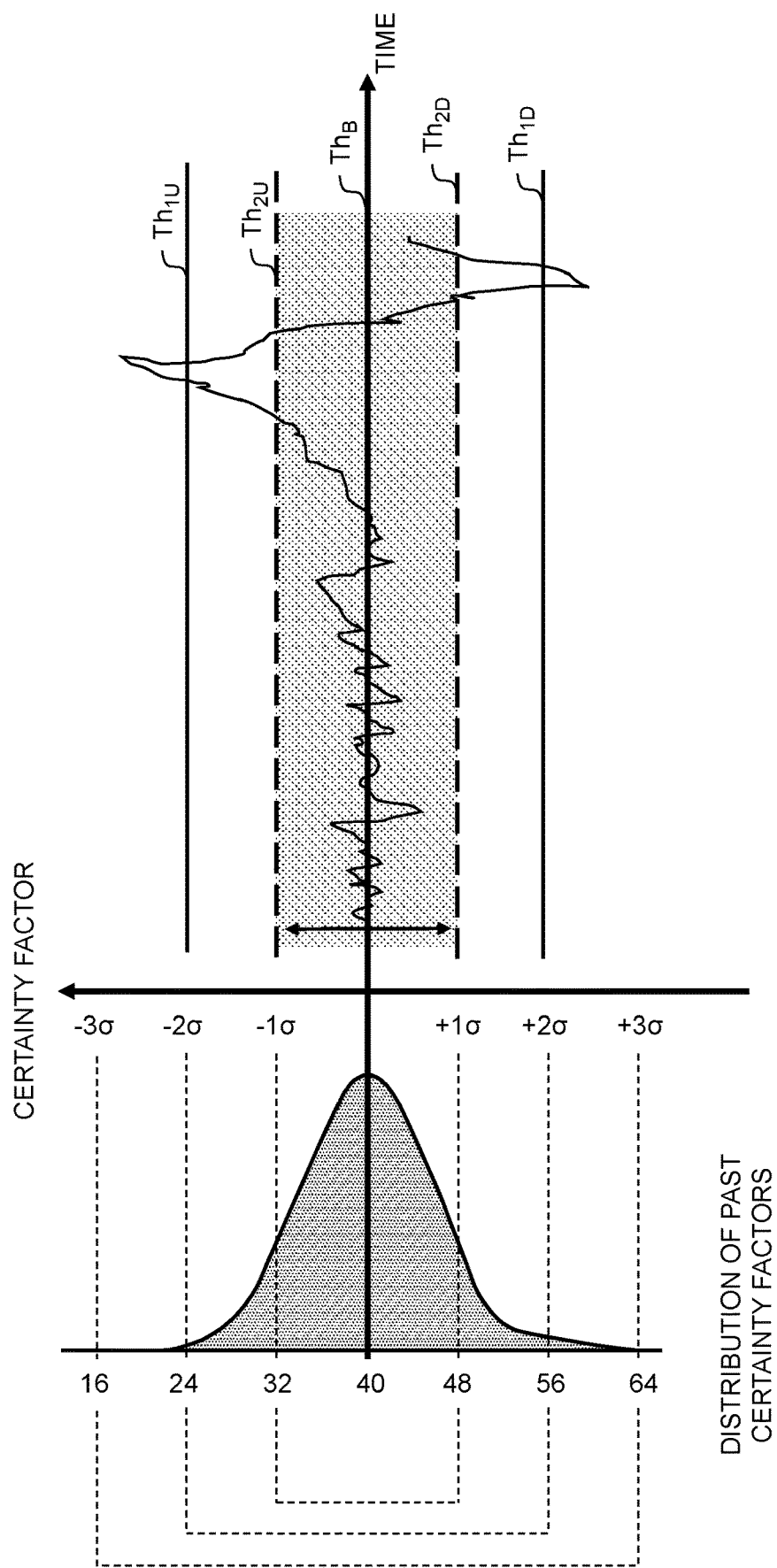
FIG. 11 is a drawing for describing a technical significance of $Th_1$ and $Th_2$.

FIG. 11 is a drawing for describing the technical significance of $Th_1$ and $Th_2$.

With regard to the model M100, $Th_1$ and $Th_2$ are set on the basis of $Th_B$ (reference certainty factor) determined on the basis of a distribution of the past certainty factors (or other information). For example, the certainty factor comparison unit 61 may also regularly calculate $Th_B$, and change at least one of $Th_1$ and $Th_2$ on the basis of the calculated $Th_B$.

$Th_1$ includes $Th_{1U}$ meaning $Th_1$ as an upper limit, and $Th_{1D}$ meaning $Th_1$ as a lower limit. $Th_2$ includes $Th_{2U}$ meaning $Th_2$ as an upper limit, and $Th_{2D}$ meaning $Th_2$ as a lower limit. $Th_{2U}<Th_{1U}$ is satisfied, and $Th_{2D}>Th_{1D}$ is satisfied. In other words, $Th_2$ is closer to $Th_B$ than $Th_1$. The certainty factor normally changes in a certainty factor range between $Th_{2U}$ and $Th_{2D}$. In a case where the certainty factor of the model M100/(N−1) in operation exceeds (is below or above) $Th_2$, the learning unit 55 prepares the model M100/N by the relearning of the model M100. In a case where the certainty factor of the model M100/(N−1) in operation exceeds (is below or above) $Th_1$, the model replacement unit 65 deploys the model M100/N.

As described above, since $Th_1$ and $Th_2$ are provided, the model preparation and replacement can be performed at the appropriate timings.

Third Embodiment

A third embodiment will be described. At this time, a difference from the first and second embodiments will be mainly described, and descriptions on a commonality with the first and second embodiments will be omitted or simplified.

Figure 12:
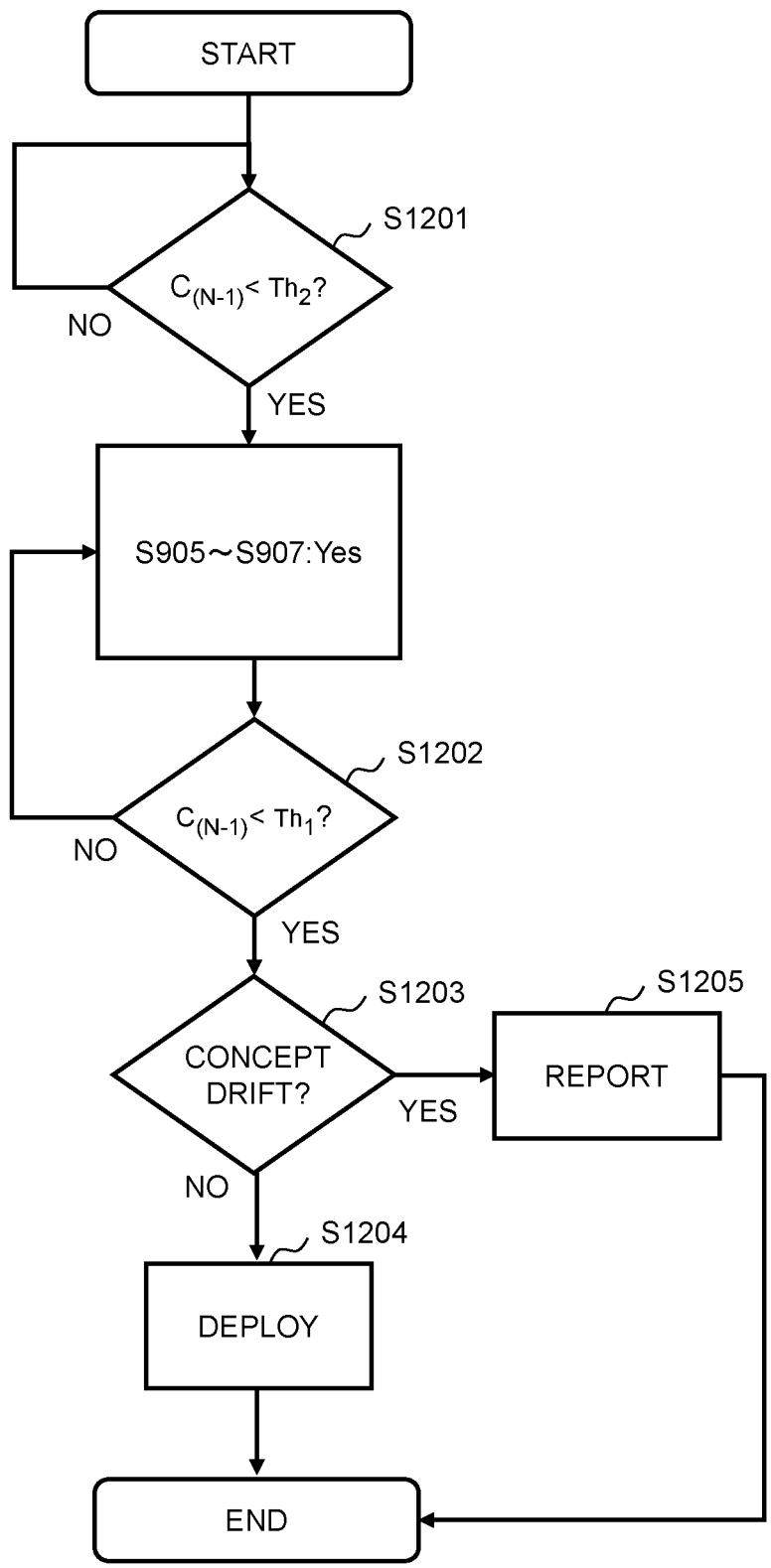
FIG. 12 is a drawing illustrating a part of a flow of processing performed by the operation monitoring apparatus according to a third embodiment.

FIG. 12 is a drawing illustrating a part of a flow of processing performed by the operation monitoring apparatus according to the third embodiment.

The certainty factor comparison unit 61 determines whether or not $C_{(N-1)}<Th_2$ is satisfied (S1201).

In a case where the determination result in S1201 is true (S1201: Yes), model evaluation is performed, that is, from S905 to S907: Yes.

Thereafter, the certainty factor comparison unit 61 determines whether or not $C_{(N-1)}<Th_1$ is satisfied (S1202).

In a case where the determination result in S1202 is true (S1202: Yes), the cause determination unit 63 determines whether or not the concept drift occurs (S1203). In a case where the determination result in S1203 is true (S1203: Yes), the cause determination unit 63 performs the report processing (S1205).

In a case where the determination result in S1203 is false (S1203: No), the model replacement unit 65 deploys the model M100/N (S1204).

Fourth Embodiment

Figure 13:
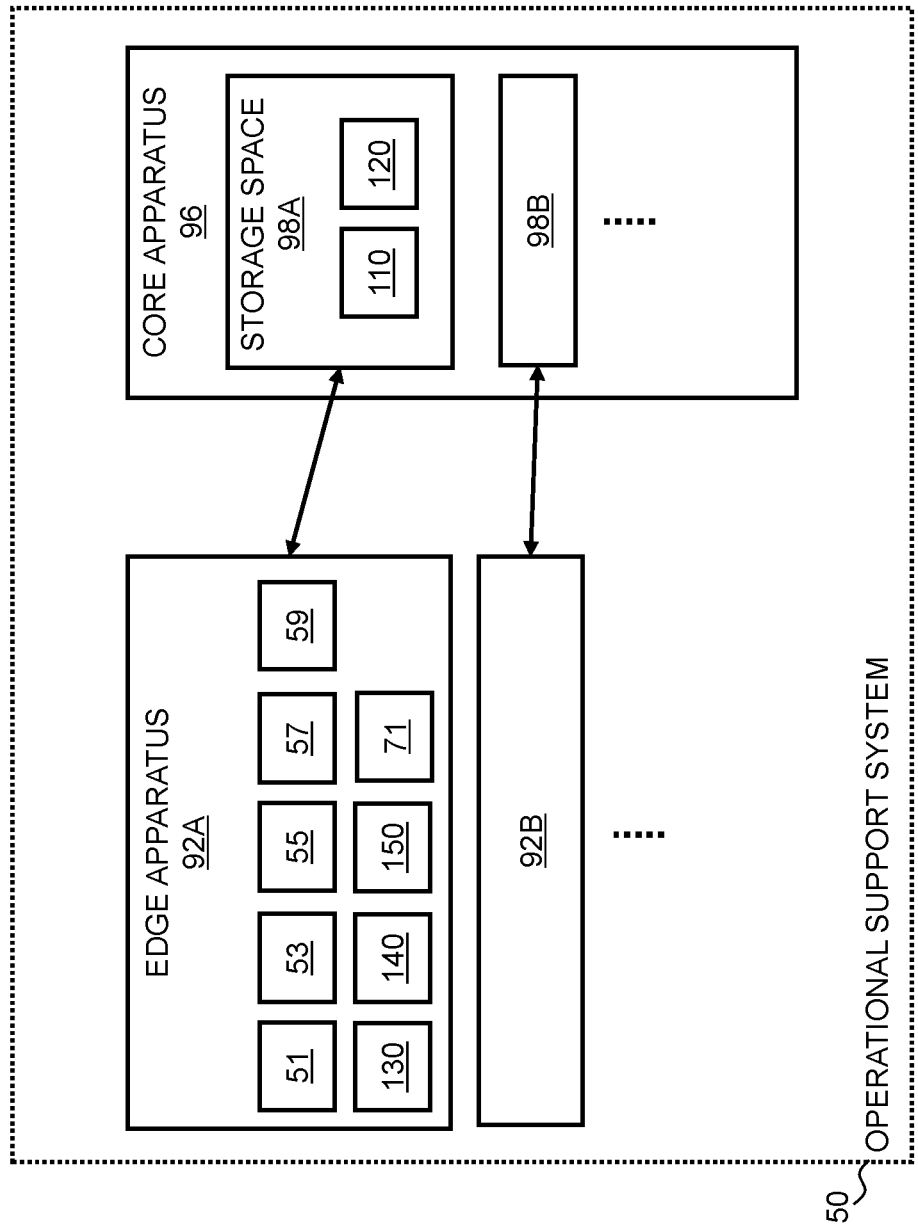
FIG. 13 is a drawing illustrating an outline of the operational support system according to a fourth embodiment.

FIG. 13 is a drawing illustrating an outline of the operational support system according to a fourth embodiment.

According to the first to third embodiments, the functions such as the annotation unit 51, the preprocess unit 53, the learning unit 55, the operation unit 57, the monitoring unit 59, and the display unit 71 are consolidated in the operational support apparatus corresponding to an example of the core apparatus. However, these functions may also be consolidated in the edge apparatus instead of the core apparatus, or may also be distributed to the edge apparatus and the core apparatus. That is, the operational support system may be one or both of the edge apparatus configured to transmit the data and the core apparatus configured to receive the data.

According to the example illustrated in FIG. 13, a plurality of edge apparatuses 92A, 92B, . . . , and a core apparatus 96 are included. The edge apparatus 92 (for example, 92A) has the annotation unit 51, the preprocess unit 53, the learning unit 55, the operation unit 57, the monitoring unit 59, and the display unit 71, and also stores the teaching data management table 130, the annotation management table 140, and the inspection data management table 150. The core apparatus 96 provides a plurality of storage spaces 98A, 98B, . . . , corresponding to the plurality of edge apparatuses 92A, 92B, . . . , respectively. The storage space 98 (for example, 98A) stores the model management table 110 and the operation management table 120 corresponding to the edge apparatus 92 that corresponds to the storage space 98. The information representing the model created by the relearning in the edge apparatus 92 is registered in the tables 110 and 120 in the storage space 98 corresponding to the edge apparatus 92. In addition, the model itself may also be stored in the storage space 98.

The first to fourth embodiments described above can be summarized as described below, for example.

The operational support system 50 monitors the certainty factor of the model M100/(N−1) in operation in real time. Specifically, the operational support system 50 includes the learning unit 55 configured to perform the relearning for creating one or a plurality of models each having a different version, and the monitoring unit 59 configured to perform the operation monitoring for monitoring the model in operation. The monitoring unit 59 includes the certainty factor comparison unit 61 and the model replacement unit 65. The certainty factor comparison unit 61 performs the first certainty factor comparison for determining whether or not $C_{(N-1)}<Th_1$ is satisfied each time the model M100/(N−1) in operation to which the inspection data (example of the input data) is input outputs the inspection result data (example of the output data). In a case where $C_{(N-1)}<Th_1$ is satisfied, the model replacement unit 65 performs the model replacement, that is, replaces the model M100/(N−1) in operation with any of the candidate models M100/N having a certainty factor higher than the certainty factor of the model M100/(N−1) in operation where the result of true is obtained among one or more candidate models (one or more models M100 each having a version different from the version of the model M100/(N−1) in operation), as the model M100 of the operation target. With this configuration, it is possible to suppress the situation where the content represented by the inspection data (for example, the good product or the faulty product) continuously differs from the content represented by the inspection result data (for example, the good product or the faulty product) with regard to the product (one example of the target). It is noted that "$C_{(N-1)}<Th_1$" means that, depending on a type of $Th_1$ (for example, depending on whether $Th_1$ is the upper limit or the lower limit), $C_{(N-1)}$ may be either above or below $Th_1$.

The operational support system 50 may include the cause determination unit 63. In a case where $C_{(N-1)}<Th_1$ is satisfied, the cause determination unit 63 may perform a cause determination on whether or not the inspection data that is input to the model M100/(N−1) in operation where the result is obtained is a cause of the result. In a case where the result of the cause determination is false, the model replacement unit 65 may perform the above-described model replacement. During the operation of the model M100/(N−1), the inappropriate inspection data (for example, data having a different feature (for example, a tendency) from the inspection data used for the learning of the creation of the model M100/(N−1)) may be received by the operational support system 50. It is also plausible that $C_{(N-1)}$ is below $Th_1$ because of the inappropriate inspection data. In view of the above, a determination is performed on whether or not the cause that $C_{(N-1)}<Th_1$ is satisfied is data, and in a case where it is specified that the cause is not the data, in other words, in a case where the model M100/(N−1) is specified as the cause, the model replacement is performed. With this configuration, the unnecessary model replacement can be avoided. It is noted that the cause determination may be a determination on whether or not the concept drift is specified on the basis of the inspection data that is input to the model M100/(N−1) in operation where $C_{(N-1)}<T_1$ is obtained. The continuation of the input of the inspection data after the concept drift has occurred to the model M100/(N−1) can be expected to be avoided.

Each time the model M100/(N−1) in operation to which the inspection data is input outputs the inspection result data, the certainty factor comparison unit 61 may perform the second certainty factor comparison to determine whether or not $C_{(N-1)}<Th_2$ is satisfied. In a case where $C_{(N-1)}<Th_2$ is satisfied, the certainty factor comparison unit 61 may perform the model evaluation in which evaluation data is input to the candidate model M100/N (one example of at least one candidate model of one or more candidate models), and the candidate model M100/N is evaluated. That is, $C_N$ may be evaluated during a period from the selection of the model M100/N to the deployment. With this configuration, the reliability of the model M100/N after the replacement is expected. In the model evaluation, for example, the certainty factor comparison unit 61 may evaluate $C_N$ by selecting the model M100/N (one example of one or more candidate models), and inputting the inspection data (one example of the evaluation data) to the candidate model M100/N. In a case where $C_{(N-1)} < Th_1$ is satisfied and also the result of the above-described cause determination is false, in the above-described model replacement, the model after the replacement may be the candidate model M100/N in which the certainty factor $C_N$ higher than $C_{(N-1)}$ is obtained in the model evaluation. It is noted that the inspection data used for the model evaluation may be the inspection data T used for creating the candidate model M100/N and the inspection data (T+1) newer than the inspection data T. The candidate model M100/N may be a model satisfying $C_{N:T} \leq C_{N:(T+1)}$. With this configuration, the model after the replacement is expected to be a model appropriate to the inspection data of the latest feature. $C_{N:T}$ denotes a certainty factor in a case where the inspection data T used for creating the model M100/N is input to the model M100/N. $C_{N:(T+1)}$ denotes a certainty factor in a case where the inspection data (T+1) newer than the inspection data T is input to the model M100/N.

The learning unit 55 may regularly or irregularly perform the relearning out of synchronization with the operation monitoring. With this configuration, without relying on the result of the operation monitoring, the number of models having different versions can be increased, in other words, the preparation for the model replacement can be performed.

In a case where $C_{(N-1)} < Th_2$ is satisfied, the learning unit 55 may perform the relearning for creating the model having the version different from the version of the model M100/(N−1) in operation with regard to the model M100. With this configuration, it is possible to start the preparation processing for creating the candidate for the model after the replacement at an appropriate timing when $C_{(N-1)} < Th_2$ is specified.

The operational support system 50 may include the preprocess unit 53. The preprocess unit 53 may input the inspection data relevant to the condition of the data representing that the product is a good product (for example, an example of the condition represented by the annotation) to the model, and may avoid inputting the inspection data that is not relevant to the condition to the model. During the operation of the product inspection process, normally, the inspection data representing the good product is obtained more than the inspection data representing the faulty product. For this reason, an increase in the precision of the model can be expected by setting only the inspection data representing the good product as the input target. It is noted that the condition of the data representing that the product is a good product may be one example of a predetermined condition with regard to the data representing the target. The predetermined condition may also include, instead of or in addition to the condition of the data representing that the product is a good product, another condition in accordance with a field to which the operational support system is applied or a purpose (for example, a condition of the data representing that the product is a faulty product).

The model replacement unit 65 may select the model M100/N to perform the model evaluation. In a case where $C_{(N-1)} < Th_1$ is satisfied and also the result of the above-described cause determination is false, with this configuration, the reliability of the model M100/N after the replacement is expected. It is noted that the model M100/N after the replacement may be a model satisfying $C_{N:T} \leq C_{N:(T+1)}$. With this configuration, the model after the replacement is expected to be a model appropriate to the inspection data of the latest feature.

Some of the embodiments have been described above, but these embodiments are exemplification for describing the present invention, and the scope of the present invention is not intended to be limited to these embodiments. The present invention can also be executed in other various modes. For example, as described above, the present invention can also be applied to fields other than the production inspection process. For example, the present invention can be applied to a marketing field, and in the above-described case, one example of the input data may be data representing a sales track record. One example of the model may be a model of demand prediction, and one example of the output data may be data representing the number of necessary purchases.

What is claimed is:

1. An operational support system comprising:
a memory coupled to a processor, the memory storing instructions that when executed by the processor configure the processor to:
perform a relearning process to create a plurality of learning models each having a different version,
perform operation monitoring in which a learning model in operation is monitored,
perform, each time the learning model in operation outputs output data that is based on the input data, a first certainty factor comparison to determine whether a certainty factor of the learning model in operation is below a first threshold,
upon determining the certainty factor of the learning model in operation is below the first threshold, determine whether an average value of the input data has changed by a predetermined value or more, and upon determining the average value of the input data has not changed by a predetermined value or more, select a learning model among the plurality of created learning models having the different versions and having a certainty factor higher than the certainty factor of the learning model in operation,
and replace the learning model in operation with the selected learning model a learning model of an operation target,
and upon determining the average value of the input data has changed by the predetermined value or more, generate a report.

2. The operational support system according to claim 1, wherein the processor is configured to:
perform, each time the learning model in operation outputs output data that is based on the input data, a second certainty factor comparison to determine whether or not the certainty factor of the learning model in operation is below a second threshold that is closer to a reference certainty factor than the first threshold,
upon determining the certainty factor of the learning model in operation is below the second threshold, perform a model evaluation in which at least one candidate learning model of the plurality of created learning models is evaluated by inputting evaluation data to the candidate learning model.

3. The operational support system according to claim 1, wherein the processor is configured to regularly or irregularly perform the relearning out of synchronization with the operation monitoring.

4. The operational support system according to claim 1, wherein the processor is configured to perform each time the learning model in operation outputs output data that is based on the input data a second certainty factor comparison to determine whether or not the certainty factor of the learning model in operation is below a second threshold that is closer to a reference certainty factor than the first threshold, and perform the relearning in which one or more learning models each having a version different from the version of the learning model in operation are created in a case where the result of the second certainty factor comparison is true.

5. The operational support system according to claim 1, wherein the processor is configured to:

input, to a learning model, input data relevant to a predetermined condition with regard to data representing a target, and avoid inputting, to the learning model, input data that is not relevant to the predetermined condition.

6. The operational support system according to claim 5, wherein the target is a product that is set as an inspection target in a product inspection, and wherein the predetermined condition is a condition of data representing that the product is a good product.

7. The operational support system according to claim 1, wherein the processor is configured to perform a model evaluation in which at least one created learning model of the plurality of created learning models is evaluated by inputting evaluation data to the at least one created learning model, and in a case where the result of the first certainty factor comparison is true and also the result of the cause determination is false, in the model replacement, the any of created learning models is a created learning model in which a certainty factor higher than the certainty factor of the learning model in operation is obtained in the model evaluation.

8. An operational support method comprising:

performing a relearning process to create a plurality of learning models each having a different version;

perform operation monitoring in which a learning model in operation is monitored;

performing, each time the learning model in operation outputs output data that is based on the input data, a first certainty factor comparison to determine whether a certainty factor of the learning model in operation is below a first threshold;

upon determining the certainty factor of the learning model in operation is below the first threshold, determine whether an average value of the input data has changed by a predetermined value or more, and upon determining the average value of the input data has not changed by a predetermined value or more, select a learning model among the plurality of created learning models having the different versions and having a certainty factor higher than the certainty factor of the learning model in operation, as a learning model of an operation target;

replacing the learning model in operation with the selected learning model a learning model of an operation target; and and upon determining the average value of the input data has changed by the predetermined value or more, generating a report.

9. A non-transitory computer-readable medium storing a computer program for casing a computer to execute steps comprising:

performing a relearning process to create a plurality of learning models each having a different version;

perform operation monitoring in which a learning model in operation is monitored;

performing, each time the learning model in operation outputs output data that is based on the input data, a first certainty factor comparison to determine whether a certainty factor of the learning model in operation is below a first threshold;

upon determining the certainty factor of the learning model in operation is below the first threshold, determine whether an average value of the input data has changed by a predetermined value or more, and upon determining the average value of the input data has not changed by a predetermined value or more, select a learning model among the plurality of created learning models having the different versions and having a certainty factor higher than the certainty factor of the learning model in operation, as a learning model of an operation target;

replacing the learning model in operation with the selected learning model a learning model of an operation target; and upon determining the average value of the input data has changed by the predetermined value or more, generating a report.

* * * * *